US010223892B2

(12) United States Patent
Makke et al.

(10) Patent No.: US 10,223,892 B2
(45) Date of Patent: Mar. 5, 2019

(54) CIVIL-DEFENSE SYSTEM

(71) Applicant: Ford Global Technologies, LLC, Dearborn, MI (US)

(72) Inventors: Omar Makke, Oakland, MI (US); Patrick Lawrence Jackson Van Hoecke, Westland, MI (US); Hamid M. Golgiri, Westland, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/437,973

(22) Filed: Feb. 21, 2017

(65) Prior Publication Data

US 2018/0240321 A1 Aug. 23, 2018

(51) Int. Cl.
*G08B 21/10* (2006.01)
*B60Q 5/00* (2006.01)
*G08G 1/0968* (2006.01)

(52) U.S. Cl.
CPC .............. *G08B 21/10* (2013.01); *B60Q 5/00* (2013.01); *G08G 1/0968* (2013.01)

(58) Field of Classification Search
CPC ..................................................... G08B 21/10
See application file for complete search history.

(56) References Cited

U.S. PATENT DOCUMENTS

| | | | |
|---|---|---|---|
| 5,166,972 A * | 11/1992 | Smith ..................... | H04M 11/04 379/37 |
| 7,187,950 B2 * | 3/2007 | Hintermeier .......... | H04W 8/245 455/419 |
| 7,248,159 B2 | 7/2007 | Smith | |
| 7,808,378 B2 | 10/2010 | Hayden | |
| 7,979,172 B2 * | 7/2011 | Breed ..................... | G08G 1/161 701/117 |
| 8,970,400 B2 | 3/2015 | Verna et al. | |
| 9,262,789 B1 | 2/2016 | Tofte | |
| 9,383,215 B2 * | 7/2016 | Yamashiro ......... | G01C 21/3407 |
| 9,786,154 B1 * | 10/2017 | Potter .................... | G08B 25/00 |
| 2002/0024424 A1 * | 2/2002 | Burns ...................... | H04B 3/54 340/538 |
| 2008/0161987 A1 * | 7/2008 | Breed .................... | G08G 1/161 701/27 |
| 2008/0233895 A1 * | 9/2008 | Bizer .................... | H04W 84/10 455/90.2 |
| 2009/0234520 A1 * | 9/2009 | Paolacci ............. | B61L 27/0038 701/19 |
| 2010/0311345 A1 * | 12/2010 | Santori ................... | H04L 67/36 455/66.1 |

(Continued)

FOREIGN PATENT DOCUMENTS

CN 204279189 U 4/2015

OTHER PUBLICATIONS

GB Search Report dated Aug. 13, 2018 re GB Appl. No. 1802714.4.

*Primary Examiner* — Alex C Dunn
(74) *Attorney, Agent, or Firm* — Frank A. MacKenzie; Bejin Bieneman PLC

(57) ABSTRACT

A computer is programmed to receive a command to broadcast an alert; determine a plurality of routes, each for one of a plurality of ground vehicles; and instruct each ground vehicle to follow its respective route while playing a message from external speakers. The computer may be integrated into, for example, a civil-defense system.

16 Claims, 3 Drawing Sheets

(56) References Cited

U.S. PATENT DOCUMENTS

| | | | |
|---|---|---|---|
| 2012/0054028 A1* | 3/2012 | Tengler | G01C 21/3697 |
| | | | 705/14.49 |
| 2013/0035859 A1* | 2/2013 | Guatteri | G08B 21/10 |
| | | | 702/3 |
| 2013/0231043 A1* | 9/2013 | Tawfiq Moshtaha | ......... |
| | | | G06Q 30/02 |
| | | | 455/3.01 |
| 2014/0358324 A1* | 12/2014 | Sagar | G08G 1/164 |
| | | | 701/1 |
| 2014/0372015 A1 | 12/2014 | Namm | |
| 2015/0098585 A1* | 4/2015 | Storms, Sr. | H04R 27/00 |
| | | | 381/82 |
| 2015/0203218 A1* | 7/2015 | Fattori Martegani | B64G 1/56 |
| | | | 340/963 |
| 2015/0339912 A1* | 11/2015 | Farrand | G08B 25/00 |
| | | | 340/501 |
| 2016/0203697 A1* | 7/2016 | Lu | G08B 21/10 |
| | | | 340/690 |
| 2017/0067747 A1* | 3/2017 | Ricci | G01C 21/3415 |
| 2017/0155547 A1* | 6/2017 | Lockyer | H04L 41/0677 |

* cited by examiner

CIVIL-DEFENSE SYSTEM

BACKGROUND

Civil-defense sirens are designed to warn a surrounding population about a dangerous situation that is about to occur. A civil-defense siren typically generates a single sound that is audible over a geographic area surrounding the siren. Such sirens were originally developed during World War II to provide warnings about air raids. They are now often used to warn of approaching tornadoes or severe storms. Civil-defense sirens are thus sometimes called air-raid sirens or tornado sirens. Existing civil-defense warning systems such as sirens can suffer from shortcomings under which warnings are not provided, or fail to convey important information about a threat. There is a need for an improved technical infrastructure to enhance civil-defense warnings.

DETAILED DESCRIPTION

Figure 1:
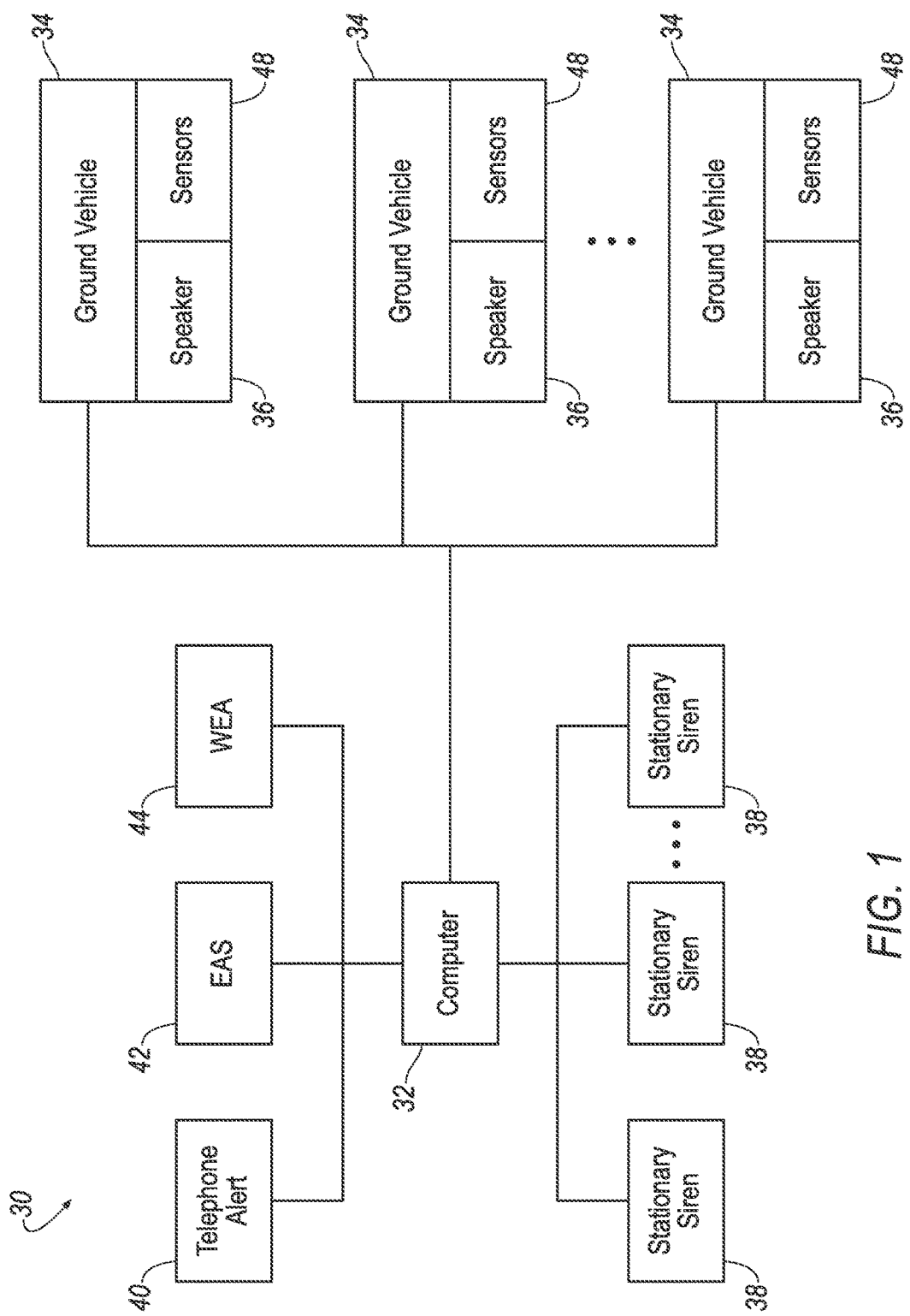
FIG. 1 is a block diagram of an exemplary civil-defense system.

With reference to the Figures, wherein like numerals indicate like parts throughout the several views, a computer 32 is programmed to receive a command to broadcast an alert; determine a plurality of routes 54, each for one of a plurality of ground vehicles 34; and instruct each ground vehicle 34 to follow its respective route 54 while playing a message from external speakers 36.

The computer 32 may be further programmed to receive data from the ground vehicles 34 about an external environment. Additionally, the data may include at least one of video, wind direction, and traffic density.

The computer 32 may be further programmed to instruct a plurality of stationary sirens 38 to activate. Additionally, the routes 54 may be based at least on a coverage area 46 of the stationary sirens 38.

The computer 32 may be further programmed to select the plurality of ground vehicles 34 from a plurality of eligible ground vehicles 34.

The routes 54 may be based at least on a population density.

The routes 54 may be based at least on a forecasted emergency area 50. The routes 54 may be based at least on substantially equalizing coverage of the forecasted emergency area 50 by the ground vehicles 34.

The computer 32 may be further programmed to request a driving range from each of the ground vehicles 34. The routes 54 may be based at least on the driving ranges of the ground vehicles 34.

The routes 54 may be based at least on areas experiencing power outages 52.

The computer 32 may be further programmed to transmit a security certificate while instructing the ground vehicles 34 to follow the routes 54.

A method includes receiving a command to broadcast an alert; determining a plurality of routes 54, each for one of a plurality of ground vehicles 34; and instructing each ground vehicle 34 to follow its respective route 54 while playing a message from the external speakers 36.

The method may include receiving data from the ground vehicles 34 about an external environment.

The method may include instructing a plurality of stationary sirens 38 to activate. Additionally, the routes 54 are based at least on a coverage area 46 of the stationary sirens 38.

The routes 54 may be based at least on the forecasted emergency area 50. The routes 54 are based at least on substantially equalizing coverage of the forecasted emergency area 50 by the ground vehicles 34.

The method may include requesting a driving range from each of the ground vehicles 34.

As part of a civil-defense system 30, the computer 32 effectively extends the range of warning for the civil-defense system 30 beyond stationary sirens 38 that are part of the civil-defense system 30. Thus, warning of an emergency or possible threat can be provided to those members of the population that are outside the range of the stationary sirens 38 or within the range of a stationary siren 38 that is disabled. The civil-defense system 30 is able to provide the warning even to those members of the population who are unable to access other media, such as radio, television, or cellular phones, during the emergency or pendency of a threat.

With reference to FIG. 1, the computer 32 may be a microprocessor-based computer. The computer 32 may include a processor, memory, etc. The memory of the computer 32 may include memory for storing instructions executable by the processor as well as for electronically storing data and/or databases.

The computer 32 is included in the civil-defense system 30. The civil-defense system 30 allows organizations such as government departments to promulgate warnings to a population within, e.g., a geographic area. The computer 32 may be in communication with various systems for communicating to the population, such as a network of the stationary sirens 38; the Emergency Broadcast System or Emergency Alert System 42, which communicates via television; telephone-based alerting systems 40; Wireless Emergency Alerts 44, which communicate through cellular phones; etc. The computer 32 may use any protocol or protocols that enable the computer 32 to communicate with the various systems, for example, the Common Alerting Protocol promulgated by the United States Department of Homeland Security's Federal Emergency Management Agency.

With continued reference to FIG. 1, the stationary sirens 38 are sirens designed to produce a noise loud enough that members of a population dispersed over a large geographic area such as an entire town are able to hear the stationary siren 38. The noise may be chosen so as to be distinctive to the stationary sirens 38 and therefore unlikely to be confused with other sirens, such as those on emergency vehicles. For example, the stationary sirens 38 may issue two simultaneous tones. The stationary sirens 38 may be able to produce multiple sounds that correspond to different types of emergencies, such as one sound for an air raid and another sound for a tornado warning.

Figure 2:
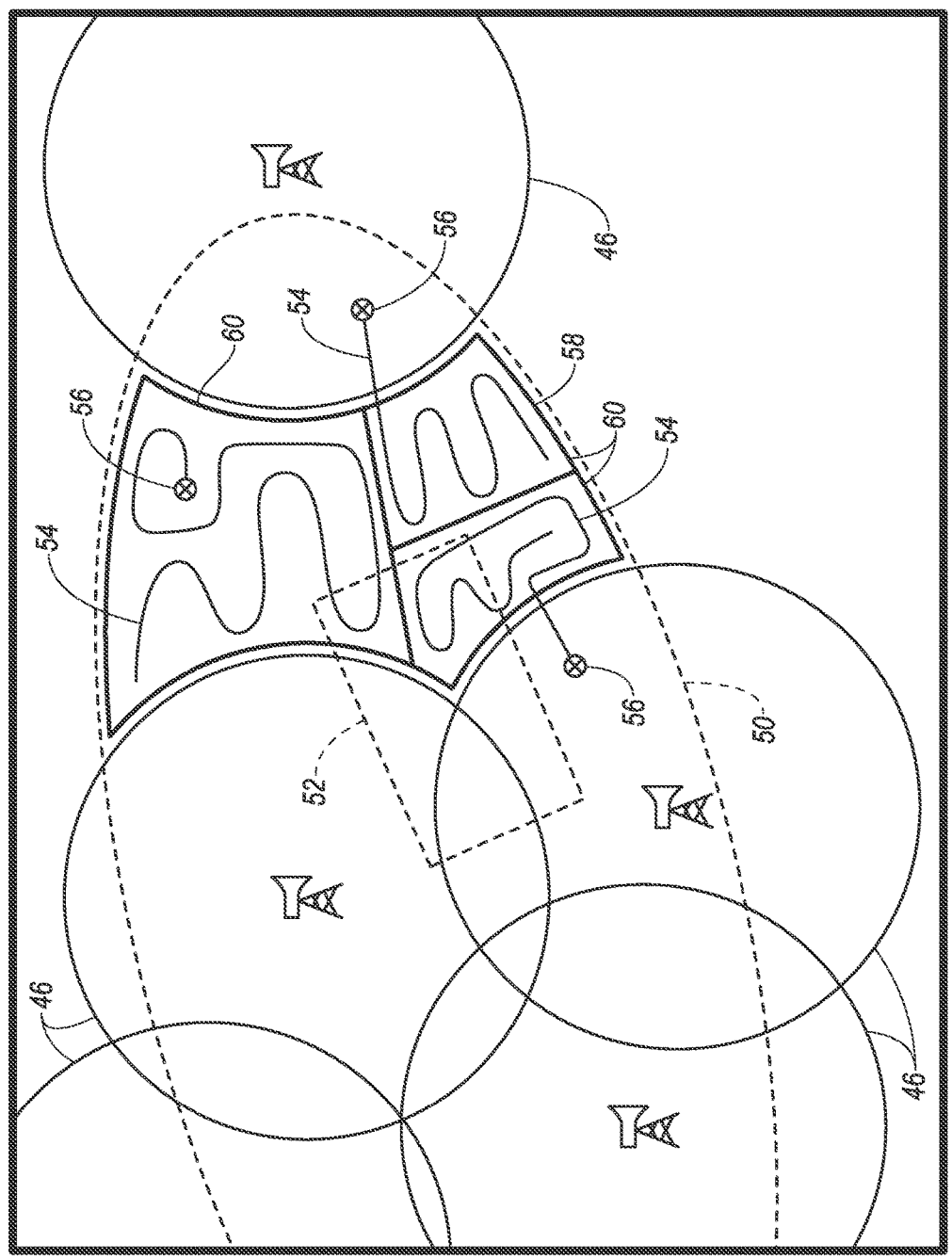
FIG. 2 is a map of a geographic area having civil-defense sirens.

With reference to FIG. 2, each stationary siren 38 has a coverage area 46, that is, a geographic area within which the stationary siren 38 is typically audible. Each coverage area 46 may be, e.g., a circle defined by a radius at which the sound produced by the stationary siren 38 is equal to a loudness threshold, such as 10 dB (decibels). The loudness threshold may be determined by the loudness necessary for a typical human to hear a sound having the frequency of the sound produced by the stationary siren 38. The coverage areas 46 may combine into an overall coverage area of the stationary sirens 38.

With reference to FIG. 1, the ground vehicles 34 may be a subset of eligible ground vehicles 34. The eligible ground vehicles 34 may be a fleet of vehicles owned or operated by the organization responsible for the stationary sirens 38. Alternatively or additionally, the eligible ground vehicles 34 may include vehicles owned by members of a population in and/or around a set of coverage areas 46, and volunteered for use during an emergency or potential threat.

The eligible ground vehicles 34 are autonomous vehicles, that is, vehicles capable of operating fully autonomously. For purposes of this disclosure, an autonomous mode is defined as one in which each of a propulsion system, a brake system, and a steering system of the ground vehicle 34 are controlled by one or more computers; in a semi-autonomous mode computer(s) of the ground vehicle 34 control(s) one or two of the propulsion system, braking system, and steering system.

With continued reference to FIG. 1, the eligible ground vehicles 34 are equipped with the external speakers 36, that is, speakers positioned to be audible outside the ground vehicle 34. For example, the external speaker 36 may be a car horn, which may be unmodified or may be modified to be able to produce particular frequencies. The particular frequencies may be the same as the frequencies produced by the stationary siren 38. Alternatively or additionally, the external speakers 36 may be speakers generally capable of replicating sounds. If so, the external speakers 36 could be capable of delivering a verbal message.

The eligible ground vehicles 34 may include sensors 48. The sensors 48 may detect internal states of each ground vehicle 34, for example, wheel speed, wheel orientation, and engine and transmission variables. The sensors 48 may detect the position or orientation of the ground vehicle 34, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 48 may detect the external world, for example, radar sensors, scanning laser range finders, light detection and ranging (LIDAR) devices, and image processing sensors such as cameras. The sensors 48 may include communications devices, for example, vehicle-to-infrastructure (V2I) or vehicle-to-vehicle (V2V) devices.

Figure 3:
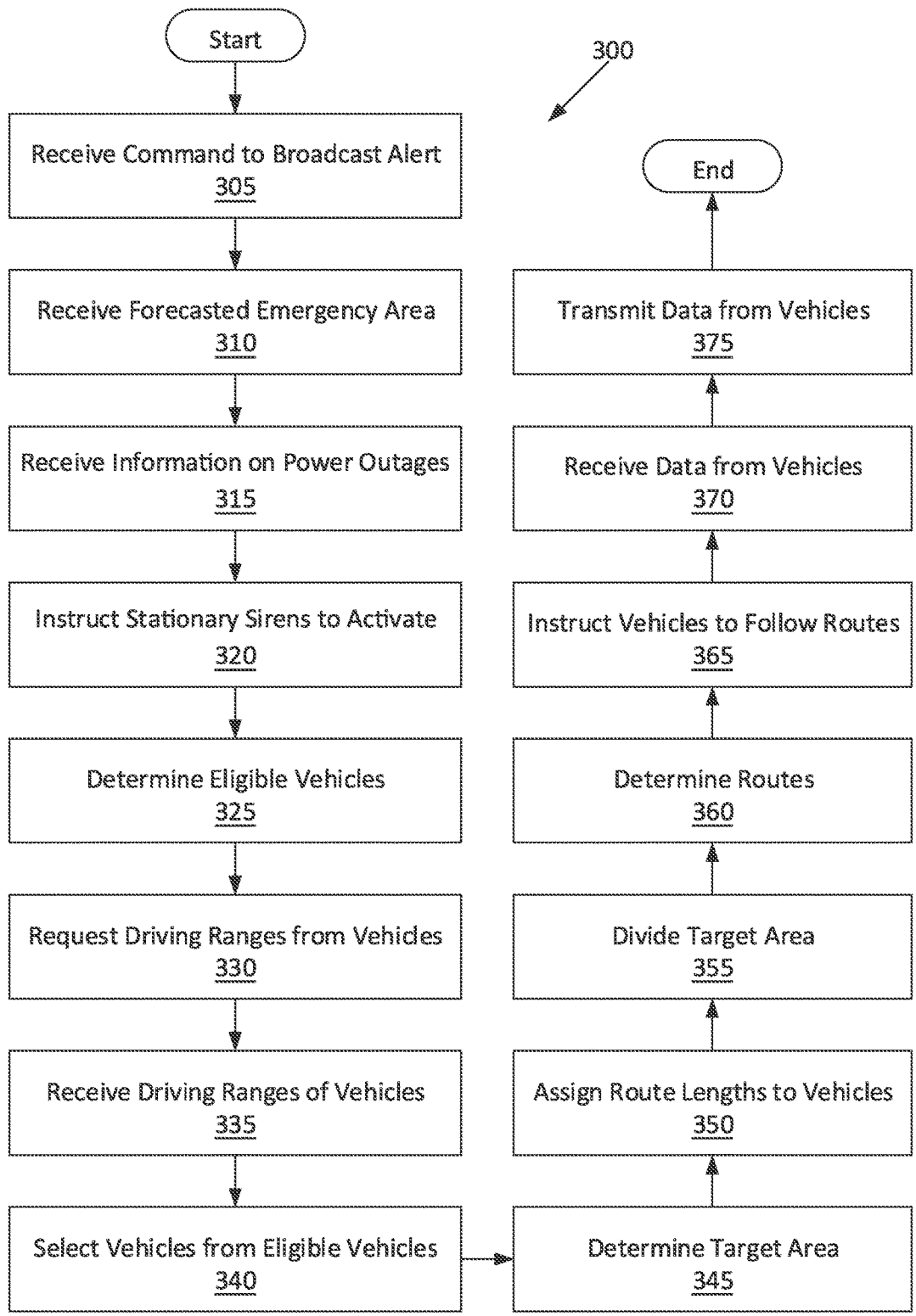
FIG. 3 is a process flow diagram of an exemplary process for conveying an emergency alert to a population.

FIG. 3 is a process flow diagram illustrating an exemplary process 300 for conveying an emergency alert to a population. The computer 32 may be programmed to carry out the steps of the process 300. The process 300 may be initiated by an operator in response to a pending or occurring emergency, such as an air raid or severe weather.

The process 300 begins in a block 305. In the block 305, the computer 32 receives a command to broadcast an alert. The command may come from an operator entering the command directly into the computer 32, or the command may come from another system within the civil-defense system 30.

Next, in a block 310, the computer 32 receives a forecasted emergency or threat area 50. As shown in FIG. 2, the forecasted emergency area 50 is a geographic area that is experiencing or is predicted to experience the emergency. For example, the forecasted emergency area 50 may be a predicted path for a severe storm.

Next, in a block 315, the computer 32 receives information on power outages. The computer 32 may generate or receive a power-outage area 52, that is, a geographic area experiencing a power outage, e.g., a blackout or a brownout.

Next, in a block 320, the computer 32 instructs a plurality of the stationary sirens 38 to activate. The computer 32 may instruct all of the stationary sirens 38 to activate, or the computer 32 may instruct a subset of the stationary sirens 38 to activate based on the forecasted emergency area 50 and/or the power-outage area 52.

Next, in a block 325, the computer 32 determines which eligible ground vehicles 34 are available. For example, the computer 32 may request an acknowledgement from the eligible ground vehicles 34, which determines which eligible ground vehicles 34 are in communication with the computer 32. Alternatively or additionally, the computer 32 may request a status update from the eligible ground vehicles 34, which determines which eligible ground vehicles 34 are not currently in use. The requests may be accompanied by security certificates or the like, i.e., a means for authentication such as is known for a vehicle 34 computer to determine that a request from the computer 32 is valid and authentic, and should be responded to, allowing the eligible ground vehicles 34 to securely identify the source of the requests. The computer 32 uses the acknowledgements and/or the status updates to generate a list of the eligible ground vehicles 34 that are available.

Next, in a block 330, the computer 32 requests a driving range from each of the available ground vehicles 34. The driving range is an estimated distance that a ground vehicle 34 can travel before running out of energy, for example, fuel for a ground vehicle 34 with an internal-combustion engine or hybrid powertrain, and battery charge for a ground vehicle 34 with an electric or hybrid powertrain. The requests may be accompanied by security certificates or the like for authentication as mentioned above.

Next, in a block 335, the computer 32 receives the driving ranges from the available ground vehicles 34. The message including the driving range may also include a security certificate.

Next, in a block 340, the computer 32 selects a plurality of ground vehicles 34 from the eligible ground vehicles 34. The computer 32 may use the availability, driving ranges, current locations 56, etc. of the eligible ground vehicles 34 to select the ground vehicles 34. The computer 32 may also use the geographic area over which the computer 32 will direct the ground vehicles 34 to select the ground vehicles 34.

As described in detail below, and summarized in this paragraph, in blocks 345-360, the computer 32 determines a plurality of routes 54, each route 54 for one of the ground vehicles 34. The routes 54 may be based on the coverage areas 46 of the stationary sirens 38, the forecasted emergency area 50, the power-outage area 52, population density or distribution, the driving ranges of the selected ground vehicles 34, the current locations 56 of the selected ground vehicles 34, etc. Specifically, the computer 32 may determine a geographic target area 58 to be covered by the ground vehicles 34 and then assign routes 54 to the ground vehicles 34 for covering the target area 58. The computer 32 may base the routes 54 on substantially equalizing coverage of the target area 58 by the ground vehicles 34. Alternatively, the computer 32 may use other optimization strategies for determining the routes 54 than those of the blocks 345-360.

In the block 345, the computer 32 determines the target area 58. The target area 58 may be based on the forecasted emergency or threat area 50, the power-outage area 52, and/or the coverage areas 46 of the stationary sirens 38. For example, the forecasted emergency area 50 may be used as the target area 58. For another example, the target area 58 may be areas outside the coverage areas 46 that are inside at least one of the forecasted emergency area 50 and the power-outage area 52.

Next, in a block 350, the computer 32 assigns a route length to each ground vehicle 34 based on the driving range of that ground vehicle 34. The route length may be equal to the driving range or may be less than the driving range by a safety factor. The safety factor may be chosen based on an uncertainty of the driving range, for example, a known standard deviation of measurements of driving ranges.

Next, in a block 355, the computer 32 divides the target area 58 into individual target areas 60 corresponding to the respective selected ground vehicles 34. The locations of the individual target areas 60 may be chosen to minimize the distances between each individual target area 60 and the corresponding ground vehicle 34. The sizes of the individual target areas 60 may be proportional to the route lengths of the corresponding ground vehicles 34. Alternatively, the sizes of the individual target areas 60 may be chosen so that the individual target areas 60 encompass populations proportional to the route lengths of the corresponding ground vehicles 34.

Next, in a block 360, the computer 32 determines the routes 54 for each ground vehicle 34 through its individual target area 60. For example, each route 54 may be chosen to maximize the number of people within hearing distance of the route 54. For another example, each route 54 may be chosen to maximize the area within the individual target area 60 that is within a given distance of the route 54. For yet another example, each route 54 may be chosen to minimize the farthest distance away from the route 54 of any point in the individual target area 60.

Next, in a block 365, the computer 32 instructs each selected ground vehicle 34 to follow its respective route 54 while playing a message from the speakers 36. The message may be a particular sound, such as a sound having the same frequency as the sound produced by the stationary sirens 38. Alternatively or additionally, the message may be a prerecorded verbal message, for example, an instruction to take cover in a basement or low-lying area. The computer 32 may transmit a security certificate or the like while instructing the ground vehicles 34 to follow the routes 54. The ground vehicles 34 may independently stop and allow entry to individuals that the ground vehicles 34 encounter while following the routes 54. The ground vehicles 34 may evacuate those individuals.

Next, in a block 370, the computer 32 receives data from the ground vehicles 34 about an external environment. The data may be gathered by the sensors 48 of the ground vehicles 34. The data may include video, wind speed, wind direction, traffic density, etc. The wind speed and wind direction may be inferred from data detailing, e.g., pitch, roll, and orientation of the ground vehicle 34.

Next, in a block 375, the computer 32 transmits the data received from the ground vehicles 34 to an operator or to other components of the civil-defense system 30. After the block 375, the process 300 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory storing processor-executable instructions, the processor programmed to:
   receive a command to broadcast an alert;
   instruct a plurality of stationary sirens to activate;
   determine a target area that excludes a coverage area of the stationary sirens;
   divide the target area into individual target areas, each for one of a specified plurality of ground vehicles;
   determine a plurality of routes, each for one of the individual target areas; and
   instruct each ground vehicle to follow its respective route while playing a message from external speakers.

2. The computer of claim 1, wherein the computer is further programmed to receive data from the ground vehicles about an external environment.

3. The computer of claim 2, wherein the data includes at least one of video, wind speed, wind direction, and traffic density.

4. The computer of claim 1, wherein the computer is further programmed to select the plurality of ground vehicles from a plurality of eligible ground vehicles.

5. The computer of claim 1, wherein the routes are based at least on a population density.

6. The computer of claim 1, wherein the target area is based at least on a forecasted emergency area.

7. The computer of claim 6, wherein the individual target areas are based at least on substantially equalizing coverage of the forecasted emergency area by the ground vehicles.

8. The computer of claim 1, wherein the computer is further programmed to request a driving range from each of the ground vehicles.

9. The computer of claim 8, wherein the routes are based at least on the driving ranges of the ground vehicles.

10. The computer of claim 1, wherein the target area is based at least on areas experiencing power outages.

11. The computer of claim 1, wherein the computer is further programmed to transmit a security certificate while instructing the ground vehicles to follow the routes.

12. A method comprising:
    receiving a command to broadcast an alert;
    instructing a plurality of stationary sirens to activate;
    determining a target area that excludes a coverage area of the stationary sirens;
    dividing the target area into individual target areas, each for one of a specified plurality of ground vehicles;
    determining a plurality of routes, each for one of the individual target areas; and
    instructing each ground vehicle to follow its respective route while playing a message from external speakers.

13. The method of claim 12, further comprising receiving data from the ground vehicles about an external environment.

14. The method of claim 12, wherein the target area is based at least on a forecasted emergency area.

15. The method of claim 14, wherein the individual target areas are based at least on substantially equalizing coverage of the forecasted emergency area by the ground vehicles.

16. The method of claim 12, further comprising requesting a driving range from each of the ground vehicles.

* * * * *